United States Patent
Komata

(10) Patent No.: US 6,760,041 B2
(45) Date of Patent: Jul. 6, 2004

(54) ELECTRONIC EQUIPMENT THAT PERFORMS ENLARGEMENT, REDUCTION AND SHAPE-MODIFICATION PROCESSING OF IMAGES ON A MONITOR, DEPENDING ON OUTPUT FROM PRESSURE-SENSITIVE MEANS, METHOD THEREFOR AND RECORDING MEDIUM RECORDED WITH THE METHOD

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 298 days.

(21) Appl. No.: 09/758,032

(22) Filed: Jan. 10, 2001

(65) Prior Publication Data

US 2001/0050691 A1 Dec. 13, 2001

(30) Foreign Application Priority Data

Jan. 14, 2000  (JP) ........................................ 2000-040266
Jan. 14, 2000  (JP) ........................................ 2000-040267

(51) Int. Cl.$^7$ ................................................ G09G 5/00
(52) U.S. Cl. ...................... 345/660; 345/667; 345/652; 345/764; 345/788
(58) Field of Search ................................ 345/660–667, 345/652, 764, 788

(56) References Cited

U.S. PATENT DOCUMENTS

| | | | | | |
|---|---|---|---|---|---|
| 5,542,039 | A | * | 7/1996 | Brinson et al. | 345/800 |
| 6,040,825 | A | * | 3/2000 | Yamamoto et al. | 345/173 |
| 2001/0040585 | A1 | * | 11/2001 | Hartford et al. | 345/667 |
| 2002/0122027 | A1 | * | 9/2002 | Kim | 345/167 |

FOREIGN PATENT DOCUMENTS

| | | |
|---|---|---|
| JP | 0 403 054 A2 | 12/1990 |
| JP | 0 626 634 A2 | 11/1994 |
| TW | 288636 | 10/1996 |

* cited by examiner

Primary Examiner—Mark Zimmerman
Assistant Examiner—Adam Arnold
(74) Attorney, Agent, or Firm—Katten Muchin Zavis Rosenman

(57) ABSTRACT

Electronic equipment which provides an easier-to-use user interface for zoom-in and zoom-out actions has a switch which includes a pressure-sensitive unit, and a processing unit that performs enlargement or reduction processing depending on the output from the pressure-sensitive unit. A computer is provided, which has a controller which has the pressure-sensitive unit a unit which generates a pressure-sensing output signal depending on a pushing pressure of a user, sensed by the pressure-sensitive unit. The computer further has a unit for converting the pressure-sensing output signal to a deformation amount for an object on the screen of the monitor and a unit which deforms the object displayed on the monitor depending on the deformation amount.

6 Claims, 23 Drawing Sheets

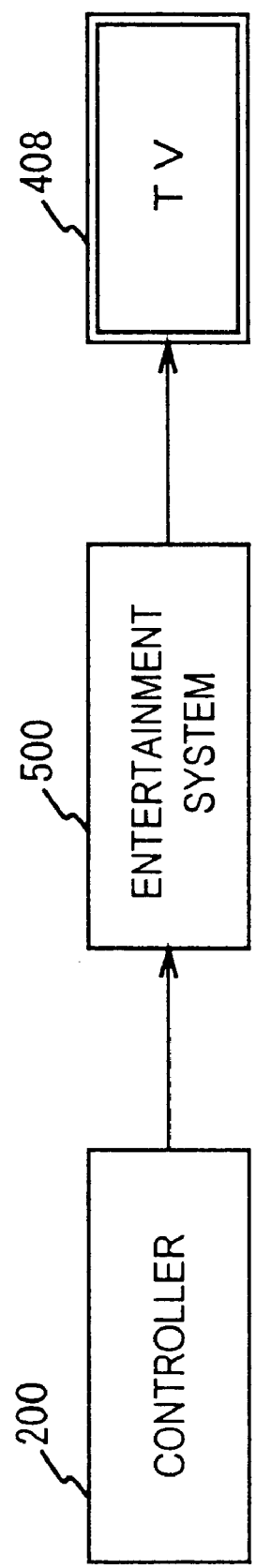

| PRESSURE-SENSING VALUE | MAGNIFICATION |
|:---:|:---:|
| 0 ~ 7 | 1 |
| 8 ~ 15 | 2 |
| 16 ~ 23 | 3 |
| ⋮ | ⋮ |
| 248 ~ 255 | 32 |

FIG. 3

| PRESSURE-SENSING VALUE | MOTOR DRIVE CURRENT |
| --- | --- |
| 0 | 0 |
| 1 | A1 |
| 2 | A2 |
| ⋮ | ⋮ |
| 255 | A255 |

FIG. 6

| PRESSURE SENSING-VALUE | ADDITION VALUE (COMMON TO x, y, z,) |
|---|---|
| 0 | 0 |
| 1 | Add 1 |
| 2 | Add 2 |
| ⋮ | |
| 255 | Add max |

FIG. 8

| CONTROLLER BUTTON | FUNCTION |
|---|---|
| B 1 | EXPAND |
| B 2 | SHRINK |
| B 3 | SEPARATE |
| B 4 | DEFORM |
| B 5 | DEFORM |
| B 6 | DEFORM |
| ⋮ | ⋮ |
| B n | DECOMPOSE |

FIG. 10

ELECTRONIC EQUIPMENT THAT PERFORMS ENLARGEMENT, REDUCTION AND SHAPE-MODIFICATION PROCESSING OF IMAGES ON A MONITOR, DEPENDING ON OUTPUT FROM PRESSURE-SENSITIVE MEANS, METHOD THEREFOR AND RECORDING MEDIUM RECORDED WITH THE METHOD

FIELD OF THE INVENTION

The present invention relates to electronic equipment that performs enlargement, reduction and shape-modification processing on images on a monitor, depending on an output from pressure-sensitive means of the electronic equipment, a method therefor and a recording medium recorded with the method.

BACKGROUND OF THE INVENTION

The so-called zoom-in and zoom-out actions are performed by holding down an ON/OFF switch operated by a user in electronic equipment. For example, if a zoom-in switch is pushed by a user, zoom-in operation mode is entered and if the switch is held down, the magnification of an image on a monitor or a screen continues to increase. On the other hand, if a zoom-out switch is pushed by the user, zoom-out operation mode is entered and if the switch is held down, the image magnification continues to decrease.

In addition, in special-effects apparatus that may modify in realtime a person's face or the like, for example, the ON/OFF switch of a special controller is operated in order to give instructions for shape modification.

In response to the operation of the ON/OFF switches of these controllers, for example, there has been disclosed a pressure-sensitive type controller in the publication of examined Japanese utility model application No. JP-B-H1-40545, wherein pressure-sensitive output is provided as input to a VCO (variable control oscillator) and the output of the VCO is used for repeated fire in a game. In addition, Japanese patent No. 2524475 discloses making a character perform a jump action in response to a pressure-sensing output and the like.

SUMMARY OF THE INVENTION

It is an object of the present invention to make zoom-in and zoom-out actions caused by the continuous pushing by a user of a simple ON/OFF switch into an easier-to-use interface for users. It is another object of the invention to make the modification of objects on the monitor or screen by the operation of a simple ON/OFF switch into an easier-to-use interface for users.

These are other objects of the present invention are attained by electronic equipment comprising a switch having pressure-sensitive means which senses a pushing pressure of a user on the switch and processing means that performs enlargement or reduction processing depending on the output from the pressure-sensitive means.

A recording medium according to the present invention on which is recorded a computer-readable and executable software program that performs processing by taking as instructions an output from a controller which has pressure-sensitive means, wherein the software program comprises a processing program that performs enlargement or reduction of objects within a screen, depending on the output of the controller.

A method of zooming according to the present invention comprises the steps of: sensing a pushing pressure of a user on a switch, and performing image enlargement or reduction processing depending on said sensed pushing pressure.

A recording medium according to the present invention on which is recorded a computer-readable and executable software program that performs processing by taking as instructions the output from a controller which has pressure-sensitive means for sensing a pushing pressure of a user operating the controller, wherein the software program comprises a processing program that modifies shapes of objects within a screen depending on the output of the controller.

A method of deforming an object on a screen of a monitor of a computer, in which according to the present invention an object displayed on monitor by a computer having a controller which has pressure-sensitive means for sensing a pushing pressure on the controller by a user of the computer, the method comprises the steps of: sensing a pushing pressure of a user with said pressure-sensitive means, generating a pressure-sensing output signal depending on said pushing pressure, converting said pressure-sensing output signal to a deformation amount for an object displayed on a monitor of the computer; and means for deforming the object depending on the deformation amount.

A the computer according to the present invention comprises a controller which has pressure-sensitive means, comprising: means of generating a pressure-sensing output signal depending on a pushing pressure of a user on the controller, sensed by said pressure-sensitive means, means for converting said pressure-sensing output signal to a deformation amount for an object displayed on a monitor of the computer; and means for deforming the object displayed on the monitor depending on the deformation amount.

BRIEF DESCRIPTION OF THE DRAWINGS

FIG. 1 is a schematic diagram showing connection of a controller to an entertainment system in order to enable a user to enjoy game software or videos.

FIG. 3 is a diagram showing a pressure-sensing value-magnification conversion table;

FIG. 6 is a table for allocating pressure-sensing values to a drive current for driving the motor;

FIG. 8 is a deformation-amount table that stipulates object deformation amounts corresponding to pressure-sensing values;

FIG. 10 is a diagram for another embodiment in which various buttons of the controller are allocated in advance to effects related to a shape modification with respect to the entire object;

DETAILED DESCRIPTION OF THE PREFERRED EMBODIMENTS

[Embodiment 1]

Here follows an explanation of an embodiment of electronic equipment that performs image enlargement or reduction processing depending on an output from pressure-sensitive means of a controller and the method therefor, with reference to the appended drawings. It is be noted that as a general rule, identical elements in the diagrams are be given the same symbols and redundant explanation thereof will be omitted.

In the present embodiment, the zoom-in and zoom-out actions are performed in realtime depending on a pressure-sensing values output when a controller which has a pressure-sensitive device is operated. Thereby, it is possible to provide a system with a user interface that is improved in comparison to the repetition of the ON action of a simple ON/OFF switch or the duration thereof.

FIG. 1 schematically shows connection of a controller to an entertainment system 500 to enable a user to enjoy game software or video. More specific examples are described in FIG. 11 on and the following figures.

As shown in this FIG. 1, a controller 200 which has buttons operated by a user and connected to pressure-sensitive devices of the controller is connected to an entertainment system 500 used for playing games or enjoying DVD video or other types using video images. The video output terminals of the entertainment system are connected to a television monitor 408.

Here, the analog output from the pressure-sensitive devices is converted by an A/D converter to digital values in the range 0–255 and provided to the entertainment system 500.

Figure 2A:
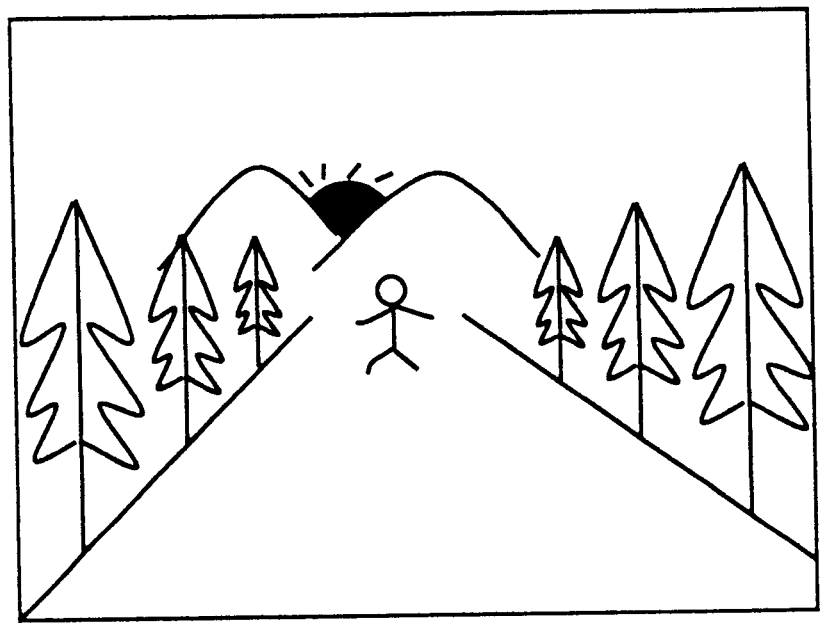
FIGS. 2A and 2B diagrammatically show the relationship between zoom-in and zoom-out status.
Figure 2B:
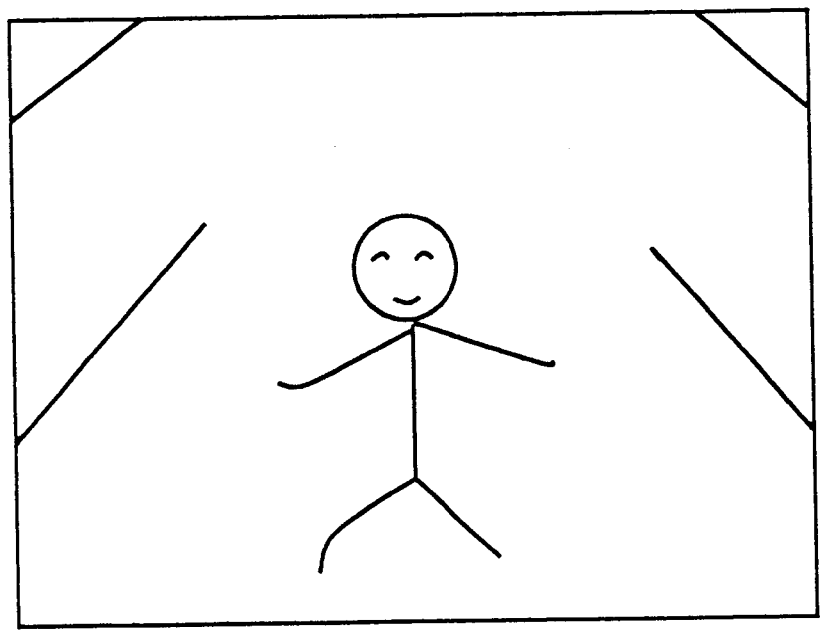
Figure 4:
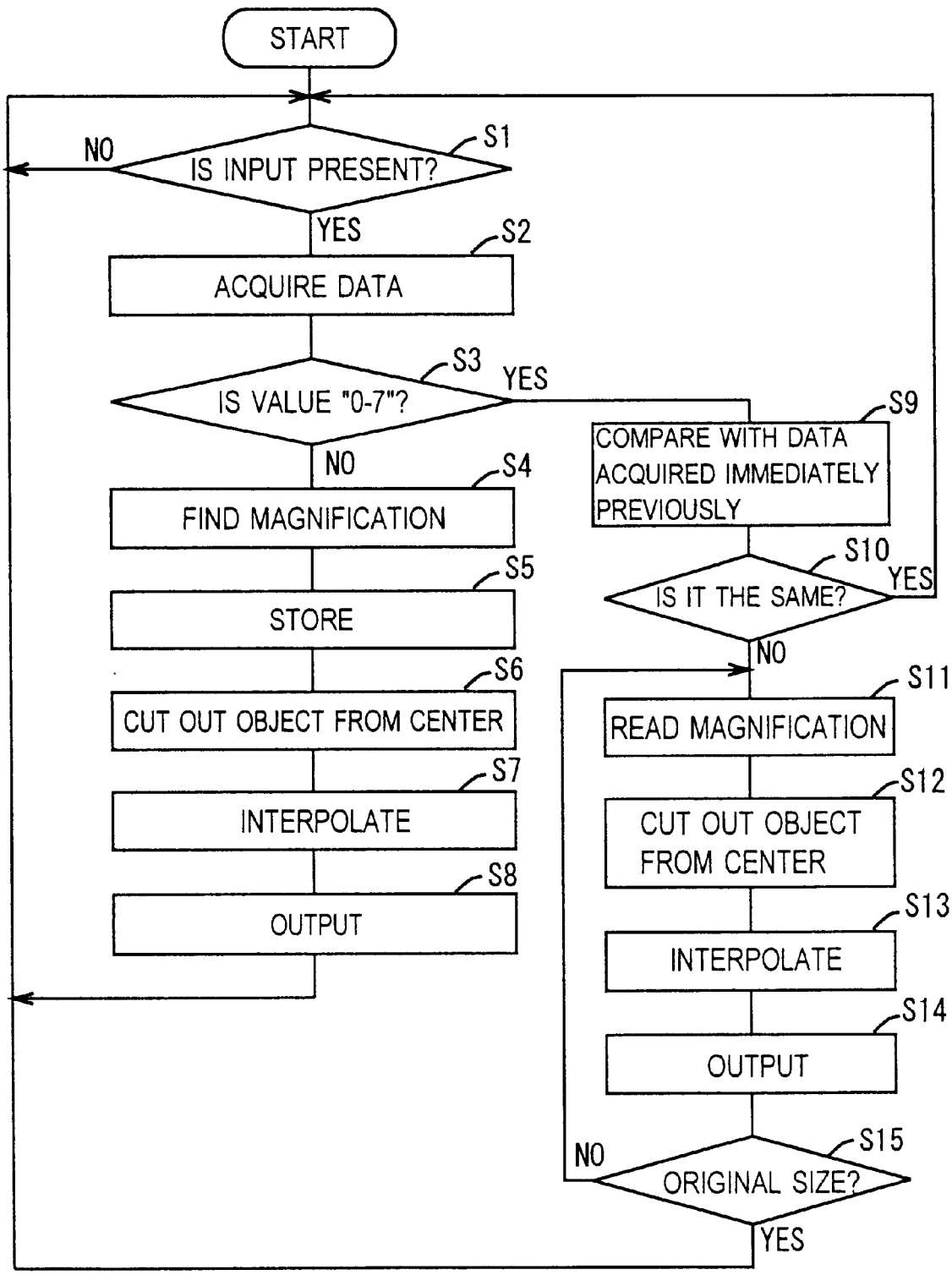
FIG. 4 is a flowchart of a program for performing zoom-in and zoom-out actions.

With reference to FIGS. 2–4, here follows a description of the case wherein zoom-in and zoom-out actions are performed by the operation of the controller 200. Zoom-in has the meaning of performing enlargement of the image shown in FIG. 2A to obtain an image shown in FIG. 2B. In contrast, zoom-out has the meaning of performing reduction of the image shown in FIG. 2B to obtain the image shown in FIG. 2A.

FIG. 3 shows a pressure-sensing value-magnification conversion table that stipulates the digital values converted from an analog output from the pressure-sensing device of the controller, as pressure-sensing values 0–7, 8–15, . . . , 248–255 corresponding to the magnifications 1, 2, . . . , 32, respectively.

The "magnification" in the description of this embodiment has the meaning of making a unit region resulting when an image region the size of one screen is divided by the numerical value indicated by the magnification into the same size as the original region having the size of one screen. For example, a magnification of 16× means that a region 1/16 the size of an image having the size of one screen may be cut from the center of the display region and blown up 16 times so that it is the same size as the display region.

Next, in reference to FIG. 4, the method of performing the zoom-in and zoom-out of an object in realtime depending on the pressure-sensing values will be described.

The flowchart shown in FIG. 4 shows the processing of a program for performing zoom-in and zoom-out actions, and this program may be supplied either recorded alone on an optical disc or other recording medium, or recorded on the recording medium together with the game software as part of the game software.

These programs are run by the entertainment system 500 and executed by its CPU.

Here, the meaning of supplying the program for performing zoom-in and out actions recorded individually on a recording medium has the meaning of preparing it in advance as a library for software development. As is common knowledge, at the time of developing software, writing all functions requires an enormous amount of time. However, if the software functions are divided by the type of function, for example, for moving objects and the like, they can be used commonly by various types of software, so more functions can be included.

To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

It is assumed that the entertainment system 500 has an image storage area equivalent to at least two screen's worth of data, so the cutting out is performed from an image stored in one of the areas, this is subjected to interpolation processing and the enlarged image is stored in the other area.

In Step S1 of the flowchart of FIG. 4, a decision is made as to whether or not data input from the pressure-sensitive controller is present, and if "YES" then the pressure-sensing value is acquired in Step S2.

In Step S3, a decision is made as to whether or not it is 0–7, and if "YES" then control processing moves to Step S9, but if "NO" then control moves to Step S4.

In Step S4, the magnification corresponding to the pressure-sensing value is obtained from the pressure-sense value-magnification conversion table shown in FIG. 3, and this magnification is stored in Step S5.

In Step S6, the portion of an image when divided by the value indicated by the magnification is cut from the central portion of the original image stored previously as shown in FIG. 2A.

The cut-out image is subjected to interpolation processing based on the value of the magnification. For example, in the case that the magnification is 16×, by means of the technique whereby the average of one pixel and the pixels around it is found, and then this average value is taken as the interpolation pixels for the basic pixel, the original pixel is interpolated to 15 pixels. Thereby, the image cut from the original image is enlarged, output in Step S8 and displayed upon the television monitor 408.

In Step S9, a comparison with the previously acquired data is performed.

In Step S10, a decision is made as to whether or not the data is identical to the previously acquired data, namely "0"–"7", and if "YES" then control processing moves back to Step S1, but if "NO" then control moves to Step S11. Here, "identical" means that, in the state in which the enlargement processing has not been executed because the immediately previous value was a value in the range "0"–"7", a pressure-sensing value in the range "0"–"7" has been input again. If the enlargement process had been done immediately previously, when a pressure-sensing value of 0–7 is next input, here this means that the enlargement process is temporarily halted. Thereby, it is possible to hold the zoom-in and halt temporarily.

If a pressure-sensing value in the range 0–7 is input again thereafter, this becomes a zoom-out order, so control moves to Step S11, and the magnification found at the time of the series of zoom-in processes performed immediately previously are read out in order from the newest to the oldest.

Moreover, in Step S12, the portion of the region divided by the value indicated by the magnification is cut from the central portion of the original image already stored, as shown in FIG. 2A, for example.

In Step S13, the cut-out image is subjected to interpolation processing by a value corresponding to the magnification. For example, in the case that the magnification is 16×, by means of the technique whereby the average of one pixel and the pixels around it is found, and then this average value is taken as the interpolation pixels for the basic pixel, the original pixel is interpolated to 15 pixels.

Thereby, the pixels cut out from the original image are enlarged, output in Step S14 and displayed upon the television monitor 408.

In Step S15, a decision is made as to whether the image is the same size as the original image and if "YES" then control processing moves back to Step S1, but if "NO" then control moves back to Step S11.

As described above, with the present embodiment, zoom-in and zoom-out actions are performed in realtime depending on the pressure-sensing value, so the user interface can be improved compared to the case of zoom-in and zoom-out actions performed with a simple ON/OFF switch.

It is to be noted that it is also possible to find the percent change from the previous pressure-sensing value to the current pressure-sense value, and perform the zoom-in or zoom-out actions at a magnification which depends on this percent change. For example, if the previous pressure-sensing value is 100 and the current pressure-sense value is 50, then the percent change is 50%, so the magnification may be made ½ the previous magnification. In addition, the rate of change of the zoom-in or zoom-out which had been constant with the normal pushing operation may be made a rate that depends on the percent change of the pressure-sensing value.

In addition, a table the reverse of that shown in FIG. 3, namely a table wherein low pressure-sensing values are allocated to large magnification values may be used so that, a zoom-out is performed depending on the pressure-sensing value input after it is recognized to be a zoom-out in Step S9. Namely, the magnification gets lower the higher the pressure-sensing value becomes. As in the example shown in FIG. 4, this means it is sufficient to end when it has become the same size as the original image.

Figure 5:
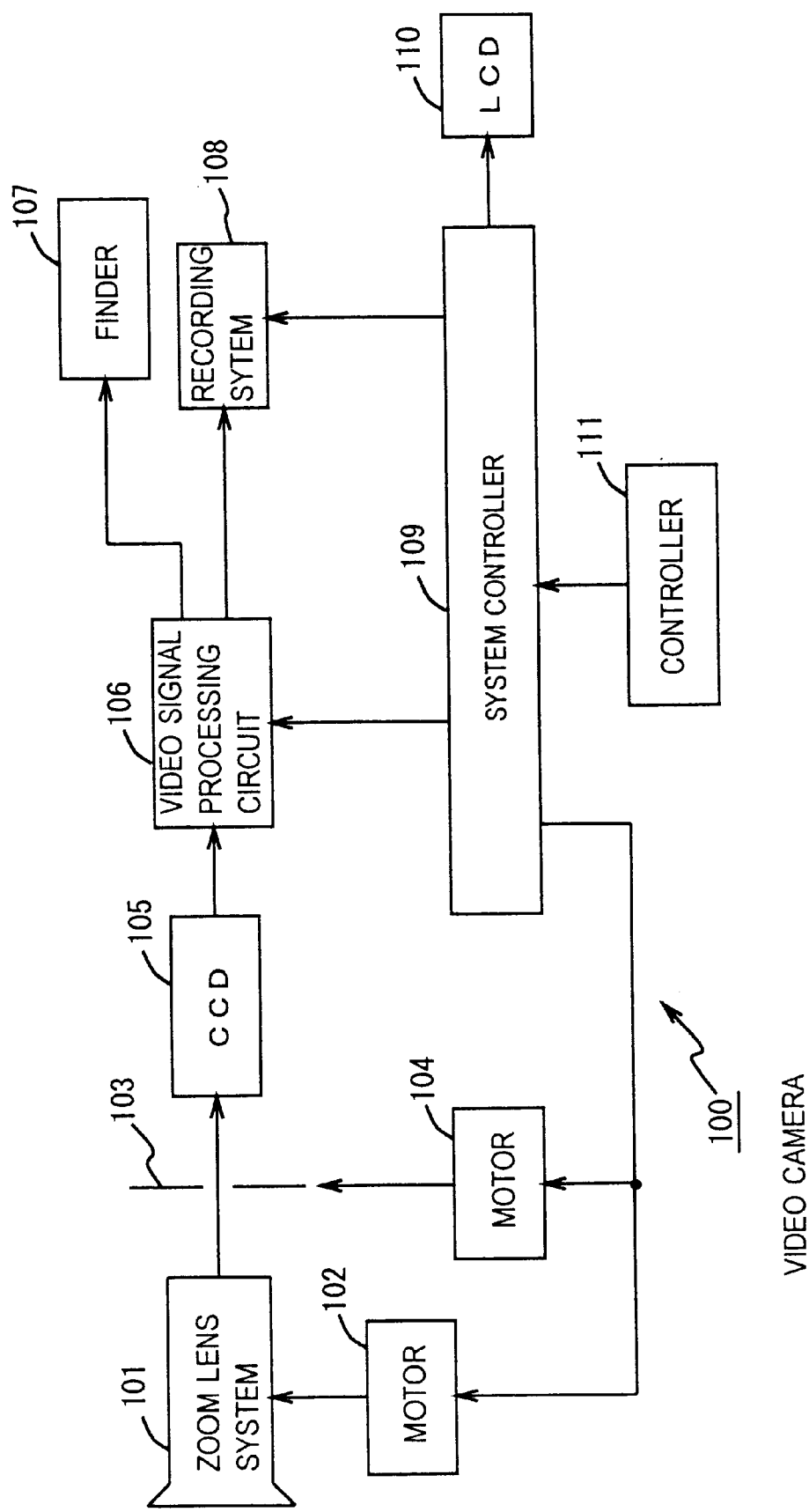
FIG. 5 shows another embodiment to which a pressure-sensing output is applied to the zooming of a video camera used for taking still images or video images.

FIG. 5 is a diagram used to describe another embodiment. In the embodiment shown in FIG. 5, pressure-sensing output is applied to the zooming of a video camera used for taking still images or video images. The video camera shown in FIG. 5 consists of a zoom lens system 101, a motor 102 for moving the zoom lens to perform zoom-in and zoom-out motions, an iris 103, a motor for moving the iris to adjust the amount of incident light, a CCD 105 for obtaining images from the light incident upon it, a video signal processing circuit 106 for turning the output from the CCD into composite, component, RGB or various other video signals, a recording system 108 for recording the video signal from the video signal processing circuit upon a recording medium, a finder 107 for displaying the video signal from the video signal processing circuit 106, a system controller 109 that controls the entire unit, an LCD 110 that displays various parameters, and a controller 111 upon which is mounted pressure-sensitive switches for setting the values of parameters.

FIG. 6 is a table for allocating pressure-sensing values supplied from the controller 111 based on the operation of pressure-sensitive switches to drive current values for driving the motor 102.

The operation is very simple. Namely, when the pressure-sensitive switch is pushed, the drive current is found based on the table, and this current is used to drive the motor 102 and move the zoom lens system so that a zoom-in is performed. Then, when the pushing is halted temporarily and then pushing is done again, zoom-out mode is entered so the rotation of the motor 102 is set to the direction opposite that at the time of zoom-in, and also, a drive current corresponding to the pressure-sensitive switch is used to drive the motor 102 so that a zoom-out is performed. When the pushing is halted and then pushing is done again, zoom-in mode is entered. Note that it is also possible to provide separate pressure-sensitive switches for both zoom-in and zoom-out, respectively.

[Embodiment 2]

Here follows an explanation of an embodiment of a method of modifying the shape of an object displayed on a screen in realtime, a computer for executing the method, and a recording medium on which the method is recorded.

In the present embodiment, the shape of an object is modified in realtime depending on the pressure-sense values output when a controller which has a pressure-sensitive device is operated. Thereby, it is possible to provide a system with a user interface that is improved in comparison to the repetition of the ON action of a simple ON/OFF switch.

The sense controller 200 which has buttons connected to pressure-sensitive devices and connected to entertainment system 500 is used for playing games or enjoying DVD video or other types of video images, and the video output terminals are connected to television monitor 408. Here, also the analog output from the pressure-sensitive devices is converted by an A/D converter to digital values in the range 0–255 and provided to the entertainment system 500.

With reference to FIGS. 7A–7B and 8–9, here follows a description of the case wherein the shape of the object is modified by the operation of the controller 200. It is assumed that the controller 200 is provided with at least so-called cruciform keys consisting of four buttons for specifying the up, down, left and right directions, along with forward and backward buttons for specifying the z direction, and a selection button for selecting the vertex coordinates P1–P7 to be modified, and each of these buttons is connected to pressure-sensitive devices. It should be noted that the cruciform keys are an illustration, and instead, it may have four buttons or other means having identical functions.

Figure 7A:
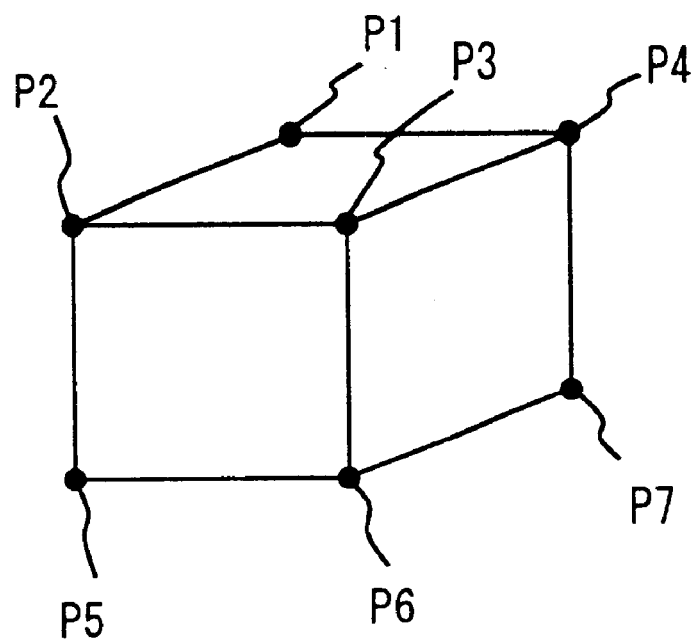
FIGS. 7A–7B show diagrams for explaining the case of modifying the shape of an object.

In order to simplify the explanation, the case of modifying the shape of the object OB shown in FIGS. 7A–7B as an example will be described. In the default state (in the case when the user has not made any settings, under the standard conditions set by the system), as shown in FIG. 7A, the object OB is displayed in roughly the center of the display area.

Then, one of the vertex coordinates P1–P7 subject to modification is selected sequentially depending on the pressure-sensing value from the selection button. The pressure-sense value from the selection button may be recognized as one of seven steps, and each step is allocated to one of the vertex coordinates P1–P7, respectively. Thus, when the pressure-sensing value lies within each of the respective steps, the sequentially selected vertex coordinates P1–P7 are modified.

The value of each of the vertex coordinates P1–P7 is modified depending on the pressure-sense values corresponding to each button. For example, if the vertex coordinate P5 of the object OB is selected with the selection button, then when the up, down, left or right buttons or forward or backward buttons are pushed, the pressure-sense values corresponding to these buttons are supplied to the entertainment system 500.

Figure 7B:
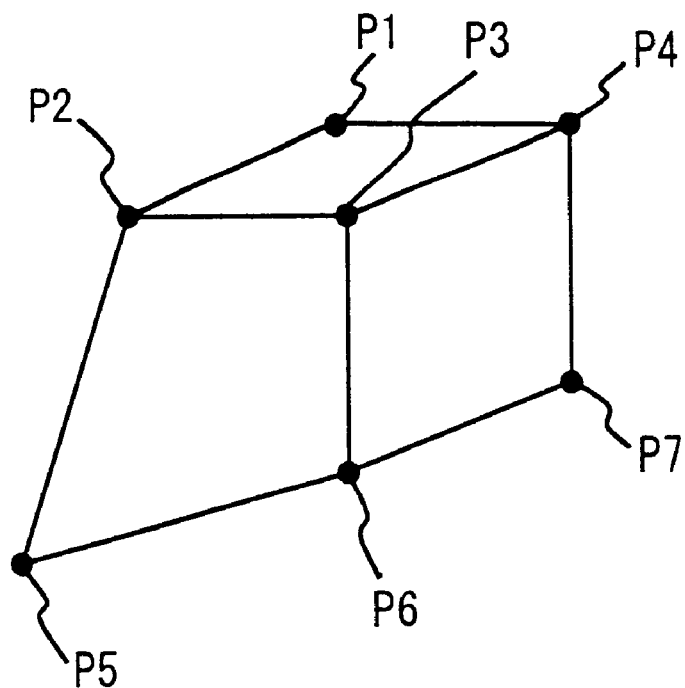

If so, values depending on the pressure-sense values are added to each of the coordinate values (x, y, z) of the vertex coordinate P5, and thus the shape of the object is modified as shown in FIG. 7B.

It is be noted that simultaneous pushing of the up, down, left and right buttons by a user is possible in the four combinations of the up and left buttons, left and down buttons, down and right buttons and the right and up buttons. When two buttons are pushed by the user simultaneously, some value is added to both x and to y, respectively. For example, when simultaneous pushing is done, an amount of deformation is found corresponding to the pressure-sense values of each button, composition of these amounts of deformation is performed and then the object OB is deformed.

FIG. 8 is a deformation amount table that defines the amount of deformation of the object corresponding to pressure-sensing values. The amount of deformation is defined with addition values Add with respect to the coordinate values (x, y, z) of the current position of the object OB. A table for selecting the addition values 0-$Add_{max}$ corresponding to the pressure-sensing values is shown. The addition values 0-$Add_{max}$ are common to x, y and z, respectively. Naturally, separate values may also be used for these x, y and z. In addition, if the deformation of the object is to be indentation with respect to the original shape, then the addition values will take negative values, although this will depend on the definition of the coordinate system.

Figure 9:
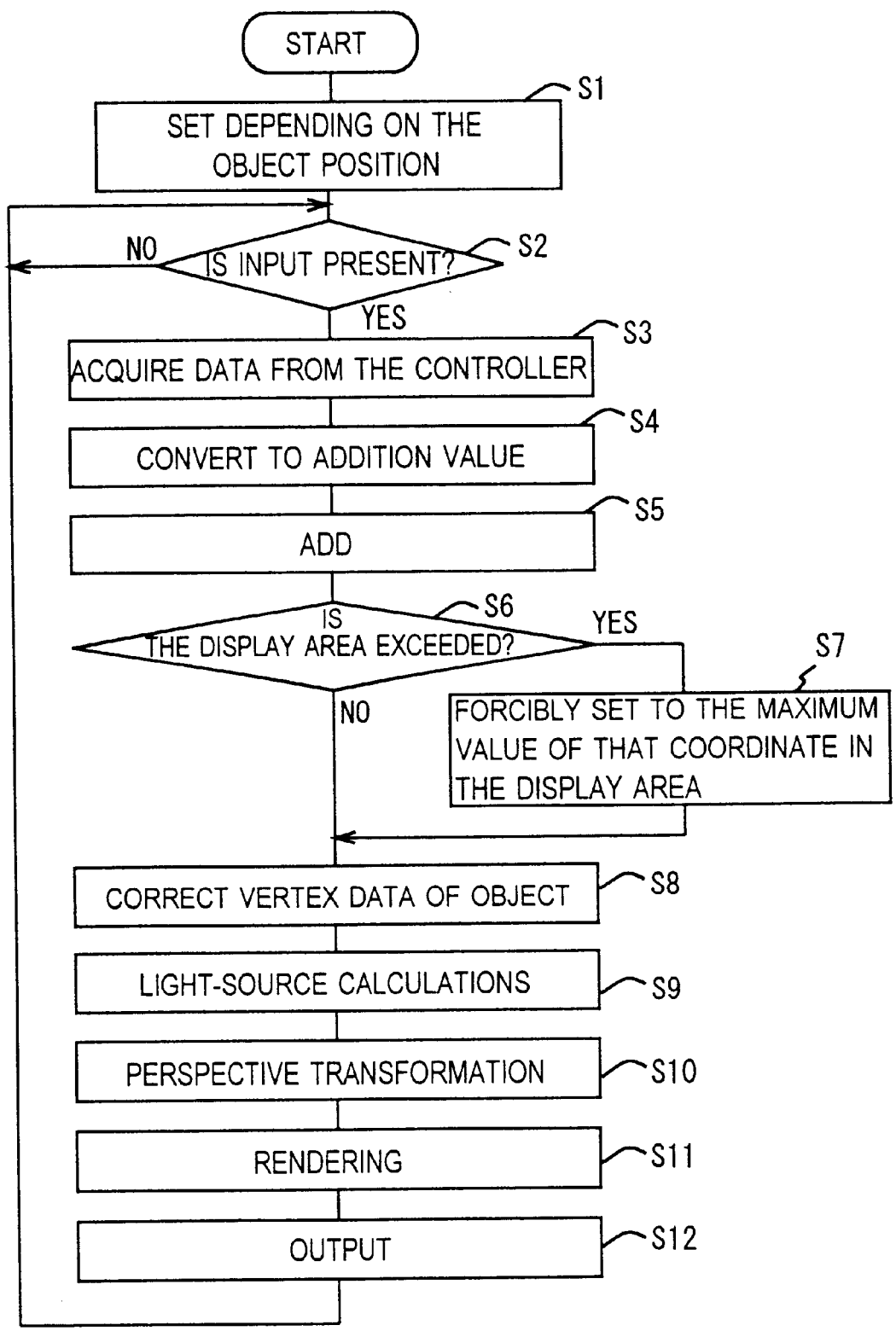
FIG. 9 is a flowchart showing the processing of a program for object shape modification.

Next, in reference to FIG. 9, the method of modifying the shape of an object in realtime depending on the pressure-sensing values will be ascribed. The flowchart shown in FIG. 9 shows the processing of a program for object shape modification, and this program may be supplied either recorded alone upon an optical disc or other recording medium, or recorded upon said recording medium together with the game software as part of the game software.

These programs are also run by the entertainment system 500 and executed by its CPU.

The meaning of supplying the program for object shape modification recorded individually on a recording medium has the meaning of preparing it in advance as a library for software development. As is common knowledge, at the time of developing software, writing all functions requires an enormous amount of time.

However, if the software functions are divided by the type of function, for example, for moving objects and the like, they can be used commonly by various types of software, so more functions can be included. To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

In Step S1 of the flowchart of FIG. 9, the vertex coordinates of the object are set at the default position of the object.

In Step S2, a decision is made as to whether or not a desired vertex coordinate has been selected by the selection button and the user has performed some deformation operation on this selected vertex coordinate, namely, whether or not input is present from any of the up, down, left or right buttons or the forward or backward buttons. If input is present ("YES"), then control processing moves to Step S3 and data is acquired from the controller 200.

In Step S4, the pressure-sensing values corresponding to each button are converted to addition values by referring to the table shown in FIG. 8.

In Step S5, the various addition values are added to the vertex coordinates (x, y, z) of the object.

In Step S6, a decision is made as to whether or not any of the vertex coordinates (x, y, z) after addition exceeds the display area, and if "YES" then control processing moves to Step S7 and that coordinate value is forcibly allocated to the maximum value of that coordinate in the display area.

In Step S8, the vertex coordinates of the object are corrected. When the various vertex coordinate values of the object are corrected depending on the viewpoint position set, in Step S9, based on light-source calculations, the intensity of pixels at the vertices indicated by various coordinate values are set.

In Step S10, the vertex coordinate values of the object are subjected to perspective transformation and transformed into two-dimensional coordinate values. In Step S11, texture data is mapped to the region indicated by these two-dimensional coordinate values, and the rendering process is performed to generate one frame of the image.

In Step S12, the image thus generated is displayed on the television monitor 408 shown in FIG. 1. Thereafter, control moves back to Step S2.

As described above, with the present embodiment, the modification of an object is performed in realtime depending on the pressure-sense value, so the user interface can be improved compared to the case of modification of an object performed with a simple ON/OFF switch.

It should be noted that it is also possible to find the percent change from the previous pressure-sense value to the current pressure-sense value, and perform the modification of the shape of an object at a rate coefficient which depends on this percent change. For example, if the previous pressure-sense value is 100 and the current pressure-sense value is 50, then the percent change is 50%, so the rate coefficient may be made ½ the previous rate coefficient.

Here, the rate coefficient is a coefficient multiplied by the vertex coordinates (x, y, z), so a table of coefficients corresponding to pressure-sensing values is prepared. By multiplying by a rate coefficient, the rate of increase or decrease of the increasing or decreasing vertex coefficient values is raised or lowered. Namely, the rate of change of coordinate values which is constant with the normal pushing operation can be made faster or slower.

It is noted that cases wherein the deformed object is fixed include:

(1) when the pressure-sense value acquired becomes more than a stipulated amount less than the previous one, and
(2) when a command to halt deformation was sent from another button.

FIG. 10 is a diagram used to explain another embodiment. As shown in FIG. 10, this is an example wherein the various buttons of the controller 200 are allocated in advance to effects related to various types of shape modification with respect to the entire object.

For example, button B1 of the controller 200 is set to "Expand" and this means that the object will be expanded depending on the pressure-sensing value corresponding to button B1. "Shrink" has the meaning that the object will be contracted depending on the pressure-sensing value corresponding to button B2, while "Separate" has the meaning that the object will be separated into a number of parts depending on the pressure-sensing value corresponding to button B3, "Deform" has the meaning that various types of deformation processes will be performed depending on the pressure-sense values corresponding to buttons B3 through B6 and "Decompose" has the meaning that the object will be decomposed into a number of parts depending on the pressure-sensing value corresponding to button Bn. Note that the amount of change due to these function can be stored in advance in a table such as that shown in FIG. 8.

[Entertainment System]

Figure 11:
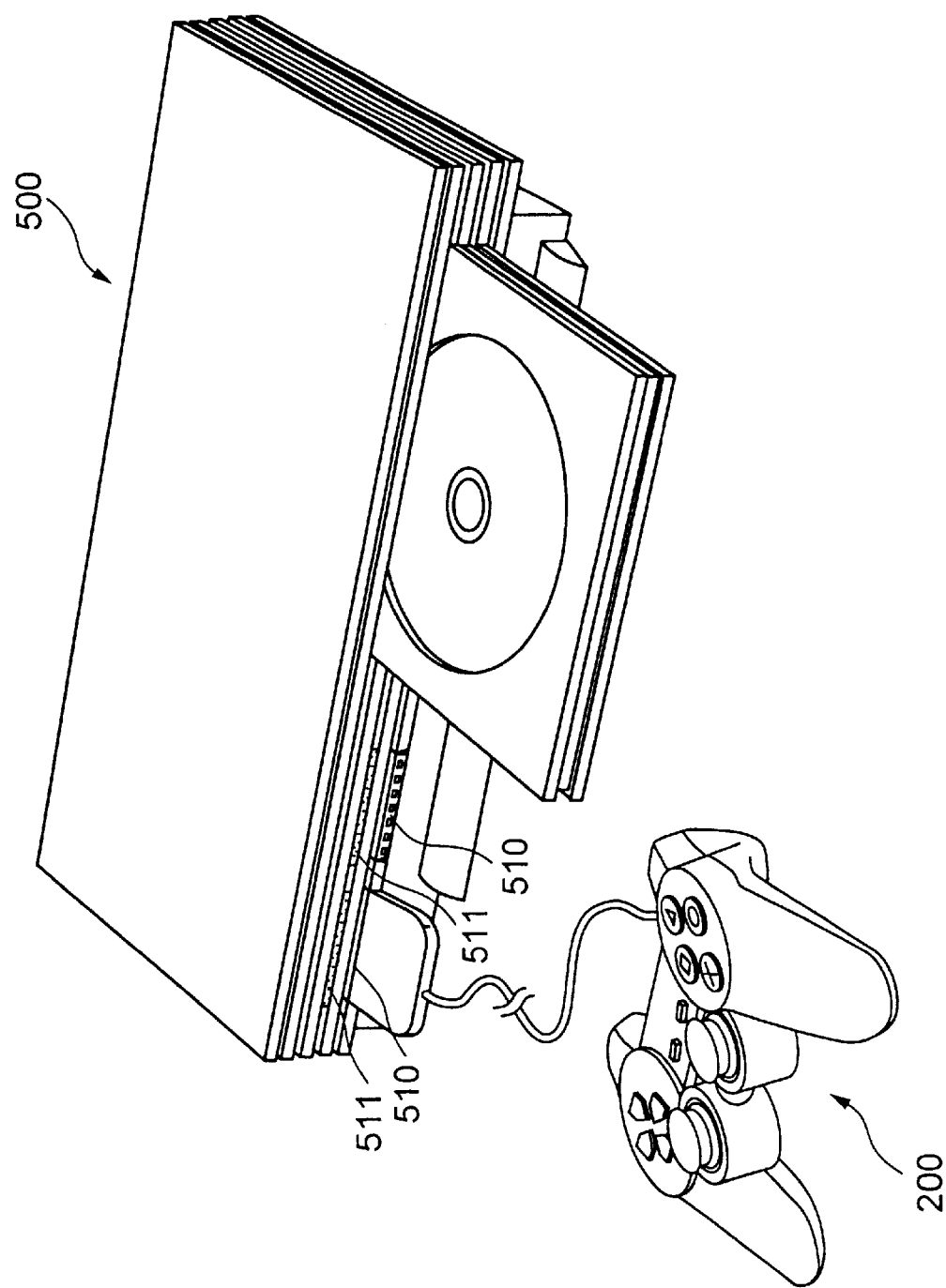
FIG. 11 is a perspective view of the controller connected to the entertainment system.

FIG. 11 is a perspective view showing the controller 200 connected to entertainment system 500. The controller 200 is removably connected to the entertainment system 500, and the entertainment system 500 is connected to television monitor 408.

The entertainment system 500 reads the program for a computer game from recording media upon which that program is recorded and by executing the program, displays characters on the television monitor 408. The entertainment system 500 has also various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like, on the television monitor 408.

While this depends also on the content of the computer game program, controller 200 may be allocated functions for moving the characters displayed on the television monitor 408 in the directions up, down, left or right.

Figure 12:
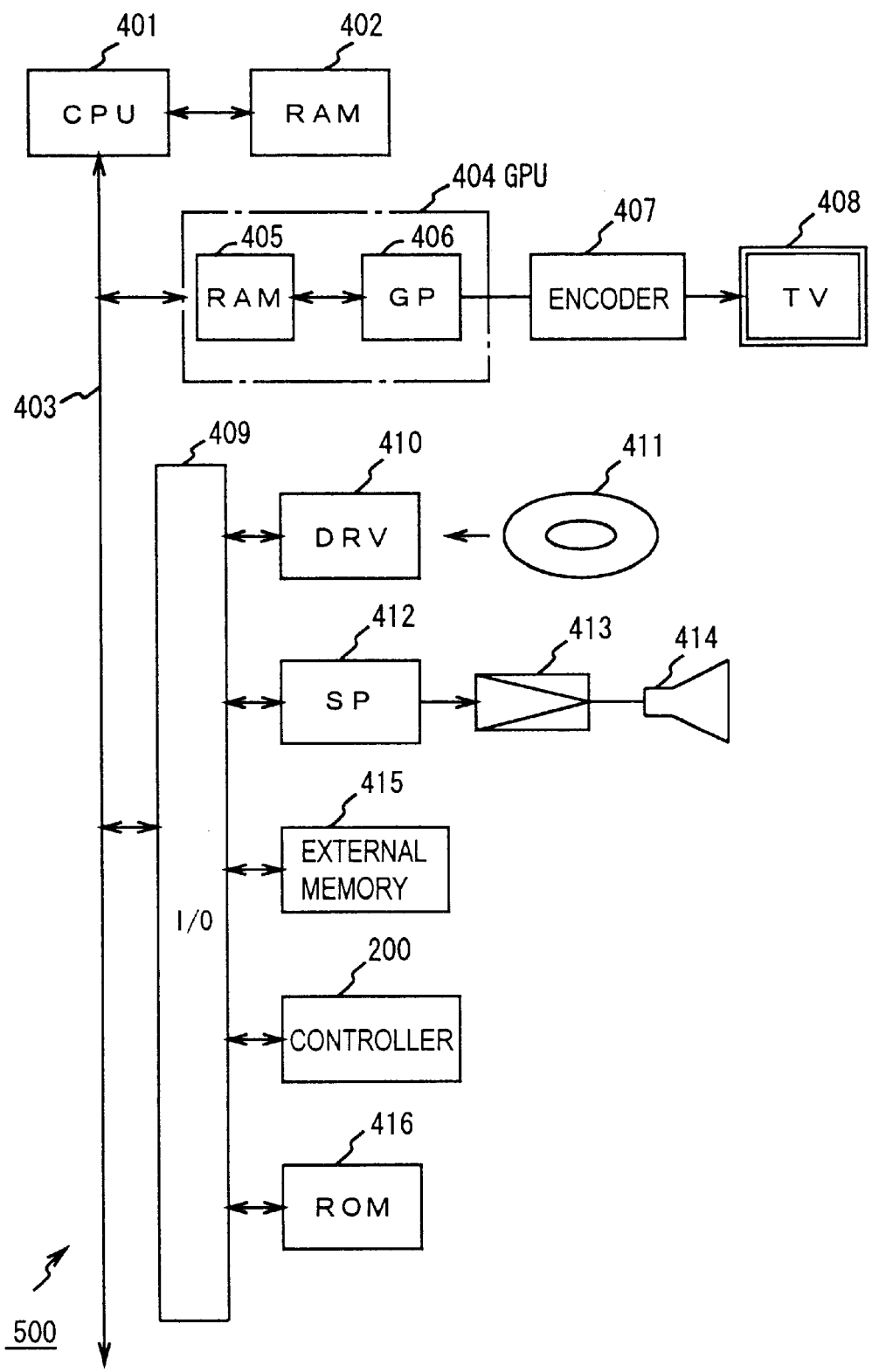
FIG. 12 is a block diagram showing the entertainment system.

With reference to FIG. 12, here follows a description of the interior of the entertainment system 500 shown in FIG. 11. FIG. 12 is a block diagram of the entertainment system 500.

A CPU 401 is connected to RAM 402 and a bus 403, respectively. Connected to bus 403 are a graphics processor unit (GPU) 404 and an input/output processor (I/O) 409, respectively. The GPU 404 is connected via an encoder 407 for converting a digital RGB signal or the like into the NTSC standard television format, for example, to a television monitor (TV) 408 as a peripheral. Connected to the Y/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via a connector 511 to the entertainment system 500 shown in FIG. 11. The controller 200 is configured such that, when a plurality of buttons provided thereupon are pushed, it gives instructions to the entertainment system 500. In addition, the driver 410 is provided with a decoder for decoding images encoded based upon the MPEG standard.

The description will be made now as to how the images will be displayed on the television monitor 408 based on the operation of controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data, Z data and texture data, the GPU 404 performs the drawing process by writing texture data sequentially into the RAM 405. Once frame of image data upon which the drawing process is completed, is encoded by the encoder 407 and then supplied to the television monitor 408 and displayed on its screen as an image.

Figure 13:
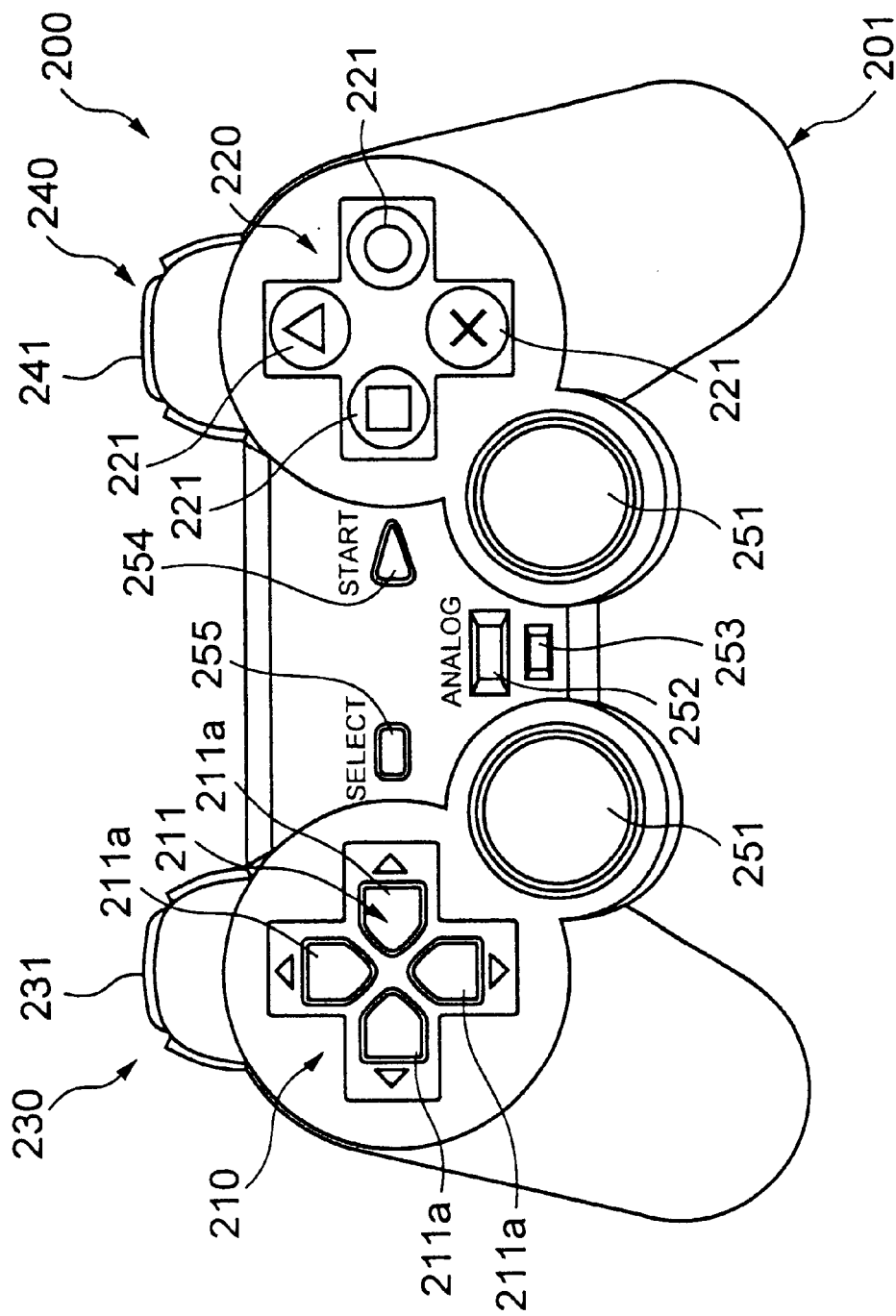
FIG. 13 is a top view of a controller.

FIG. 13 is a top view of controller 200. The controller 200 consists of a unit body 201 on the top surface of which are provided first and second control parts 210 and 220, and on the side surface of which are provided third and fourth control parts 230 and 240 of the controller 200.

The first control part 210 of the controller is provided with a cruciform control unit 211 used for pushing control, and the individual control keys 211a extending in each of the four directions of the control unit 211 form a control element. The first control part 210 is the control part for providing movement to the characters displayed on the screen of the television receiver, and has the functions for moving the characters in the up, down, left and right directions by pressing the individual control keys 211a of the cruciform control unit 211.

The second control part 220 is provided with four cylindrical control buttons 221 (control elements) for pushing control. The individual control buttons 221 have identifying marks such as "○"(circle), "X"(cross), "△"(triangle), and "□"(quadrangle) on their tops, in order to easily identify the individual control buttons 221. The functions of the second control part 220 are set by the game program recorded upon the optical disc 411, and the individual control buttons 221 may be allocated functions that change the state of the game characters, for example. For example, the control buttons 221 may be allocated functions for moving the left arm, right arm, left leg and right leg of the character.

The third and fourth control parts 230 and 240 of the controller have nearly the same structure, and both are provided with two control buttons 231 and 241 (control elements) for pushing control, arranged above and below. The functions of these third and fourth control part 230 and 240 are also set by the game program recorded upon the optical disc, and may be allocated functions for making the game characters do special actions, for example.

Moreover, two joy sticks 251 for performing analog operation are provided upon the unit body 201 shown in FIG. 13. The joy sticks 251 can be switched and used instead of the first and second control parts 210 and 220 described above. This switching is performed by means of an analog selection switch 252 provided upon the unit body 201. When the joy stocks 251 are selected, a display lamp 253 provided on the unit body 201 lights, indicating the state wherein the joy sticks 251 are selected.

It is to be noted that on unit body 201 these are also provided a start switch 254 for starting the game and a select switch 255 for selecting the degree of difficulty or the like at the start of a game and the like.

Controller 200 is held by the left hand and the right hand of a user and is operated by the other fingers of the user and in particular the user's thumbs are able to operate most of the buttons on the top surface.

FIG. 14 and FIGS. 15A–15C are, respectively, an exploded perspective view and cross-sectional views showing the second control part of the controller.

Figure 14:
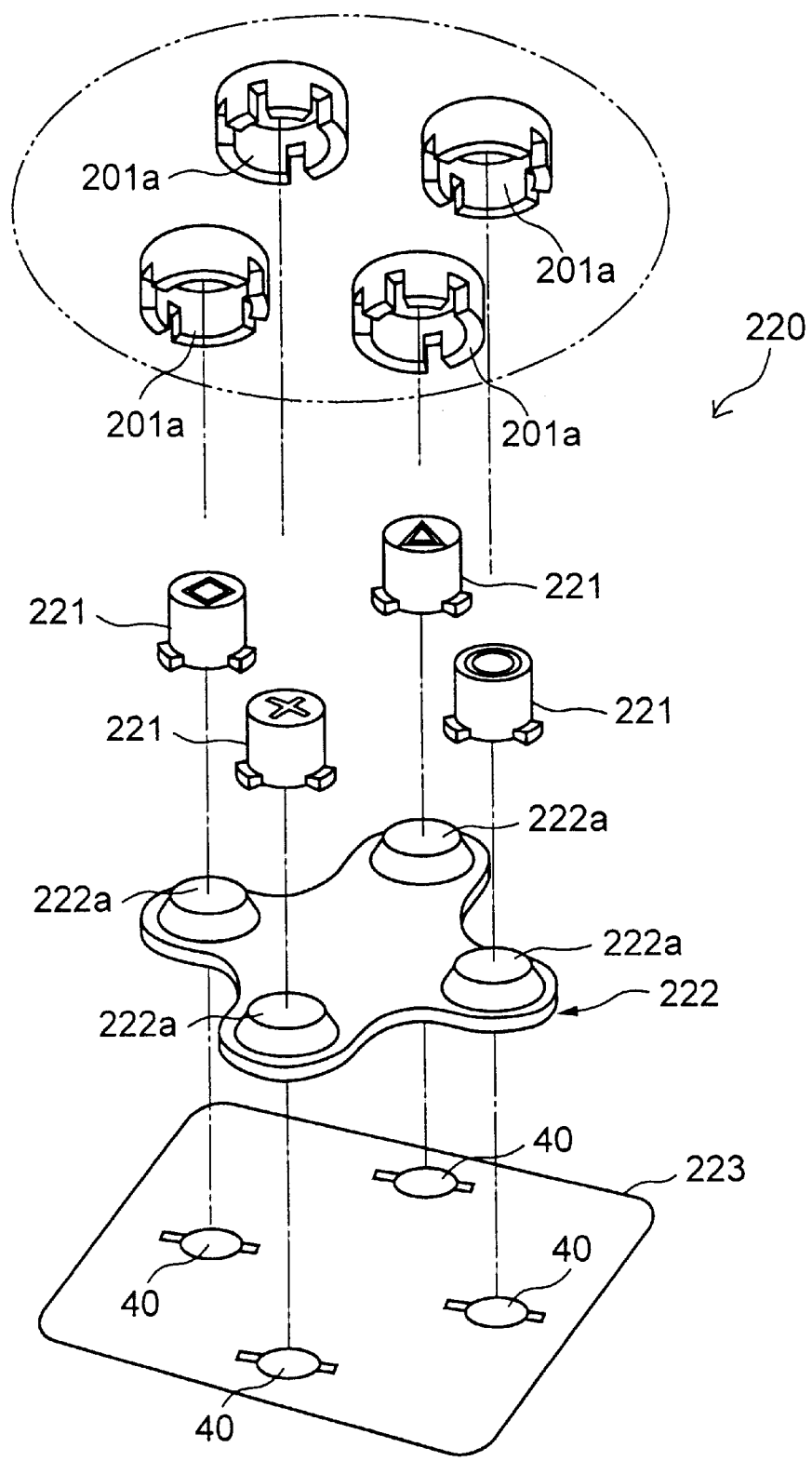
FIG. 14 is an exploded perspective view of the constitution of the second control part of the controller.

As shown in FIG. 14, the second control part 220 consists of four control buttons 221 which serve as the control elements, an elastic body 222, and a sheet member 223 provided with resistors 40. The individual control buttons 221 are inserted from behind through insertion holes 201a formed on the upper surface of the unit body 201. The control buttons 221 inserted into the insertion holes 201a are able to move freely in the axial direction.

The elastic body 222 is made of insulating rubber or the like and has elastic areas 222a which protrude upward, and the lower ends of the control buttons 221 are supported upon the upper walls of the elastic areas 222a. When the control buttons 221 are pressed, the inclined-surface portions of these elastic areas 222a flex so that the upper walls move together with control buttons 221.

Figure 15A:
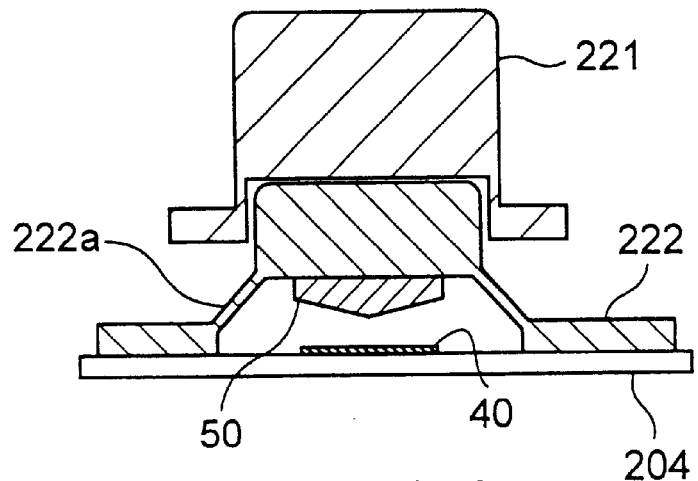
FIGS. 15A–15C are cross-sectional views of the second control part of the controller of FIG. 14.
Figure 15B:
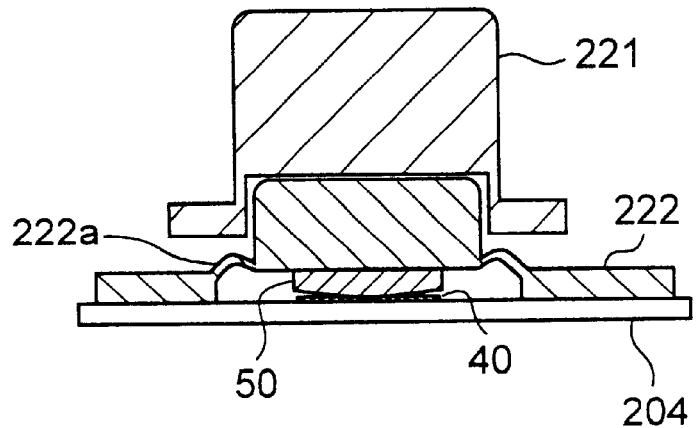
Figure 15C:
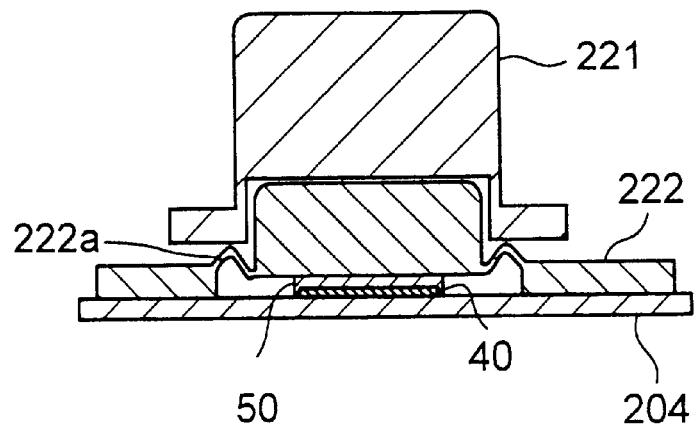

On the other hand, when the pushing pressure on the control buttons 221 is released, the flexed inclined-surface portions of elastic areas 222a elastically return to their original shape, pushing up the control buttons 221. The elastic body 222 functions as a spring means whereby control buttons 221 which had been pushed in by a pushing action are returned to their original positions. As shown in FIGS. 15A–15C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received from the control buttons 221.

To describe this in more detail, as shown in FIGS. 15A–15C, the second control part 220 is provided with control buttons 221 as control elements, an elastic body 222, conducting members 50 and resistors 40. Each conducting member 50 may be made of conductive rubber which has elasticity, for example, and has a conical shape with its center as a vertex. The conducting members 50 are adhered to the inside of the top surface of the elastic areas 222a formed in the elastic body 222.

In addition, the resistors 40 may be provided on an internal board 204, for example, opposite the conducting members 50, so that the conducting members 50 come into contact with resistors 40 together with the pushing action of the control buttons 221.

The conducting member 50 deforms, depending on the pushing force on the control button 221 (namely the contact pressure with the resistor 40), so as shown in FIG. 15B and 15C, the surface area in contact with the resistor 40 varies depending on the pressure. To wit, when the pressing force on the control button 221 is weak, as shown in FIG. 15B only the area near the conical tip of the conducting member 50 is in contact. As the pressing force on the control button 221 becomes stronger, the tip of the conducting member 50 deforms gradually so the surface area in contact expands.

Figure 16:
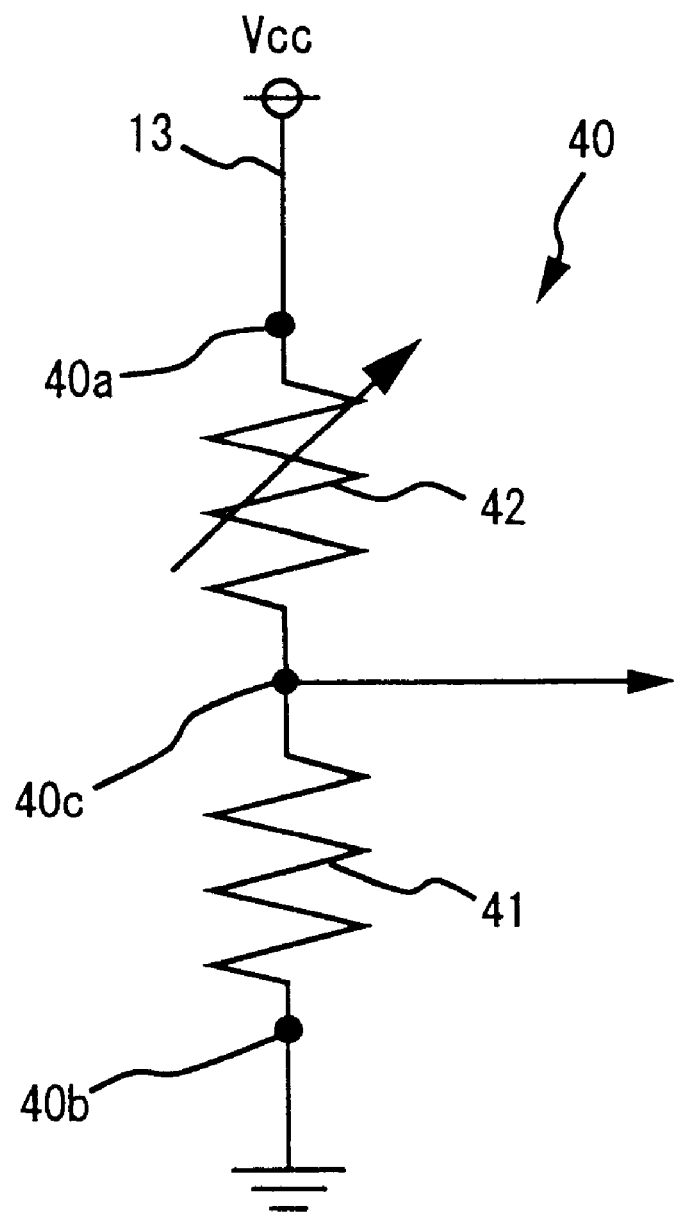
FIG. 16 is a diagram showing an equivalent circuit for a pressure-sensitive device.

FIG. 16 is a diagram showing an equivalent circuit for a pressure-sensitive device consisting of a resistor 40 and conducting member 50. As shown in this diagram, the pressure-sensitive device is inserted in series in a power supply line 13, where the voltage $V_{cc}$ is applied between the electrodes 40a and 40b. As shown in this diagram, the pressure sensitive device is divided into a variable resistor 42 that has the relatively large resistance value of the resistor 40. Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes. In this manner, the entire pressure-sensitive device can be understood to be a variable resistor. It should be noted that FIGS. 15A–15C show only the contact portion between the conducting member 50 and resistor 40 which forms the variable resistor 42 of FIG. 17, but the fixed resistor of FIG. 16 is omitted from FIGS. 15A–15C.

In the preferred embodiment, an output terminal is provided near the boundary between variable resistor 42 and fixed resistor 41, namely near the intermediate point of the resistors 40, and thus a voltage stepped down from the applied voltage $V_{cc}$ by the amount the variable resistance is extracted as an analog signal corresponding to the pushing pressure by the user on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$.

If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output form the output terminal 40c of the resistor 40 increases.

Furthermore, the analog signal (voltage) output from the output terminal 40c of the resistor 40 reaches the maximum $V_{max}$ when the conducting member 50 is most deformed.

Figure 17:
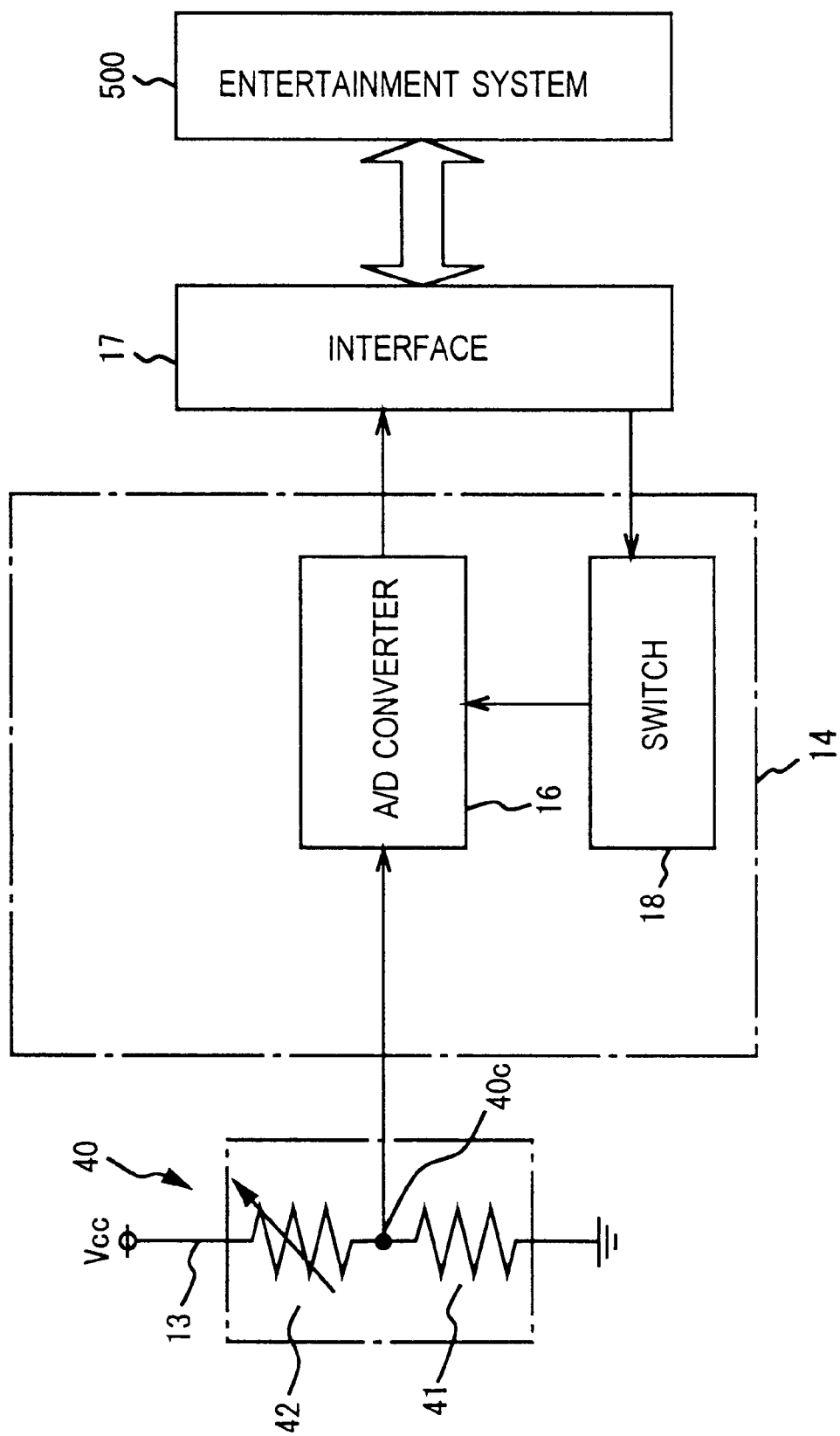
FIG. 17 is a block diagram of the main parts of the controller.

FIG. 17 is a block diagram showing the main parts of the controller 200. An MPU 14 mounted on the internal board of the controller 200 is provided with a switch 18, an A/D converter 15 and two vibration generation systems. The analog signal (voltage) output from the output terminal 40c of the resistor 40 is provided as the input to the A/D converter 16 and is converted to a digital signal The digital signal output from the A/D Converter 16 is sent via an interface 17 provided upon the internal board of the controller 200 to the entertainment system 500 and the actions of game characters and the like are executed based on this digital signal.

Changes in the level of the analog signal output form the output terminal 40c of the resistor 40 correspond to changes in the pushing pressure received from the control button SH221 (control element) as described above. Therefore, the digital signal outputted from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only as zeroes and ones.

The configuration is such that the switch 18 is controlled by a control signal sent from the entertainment system 500 based on a game program recorded on an optical disc 411. When a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 18:
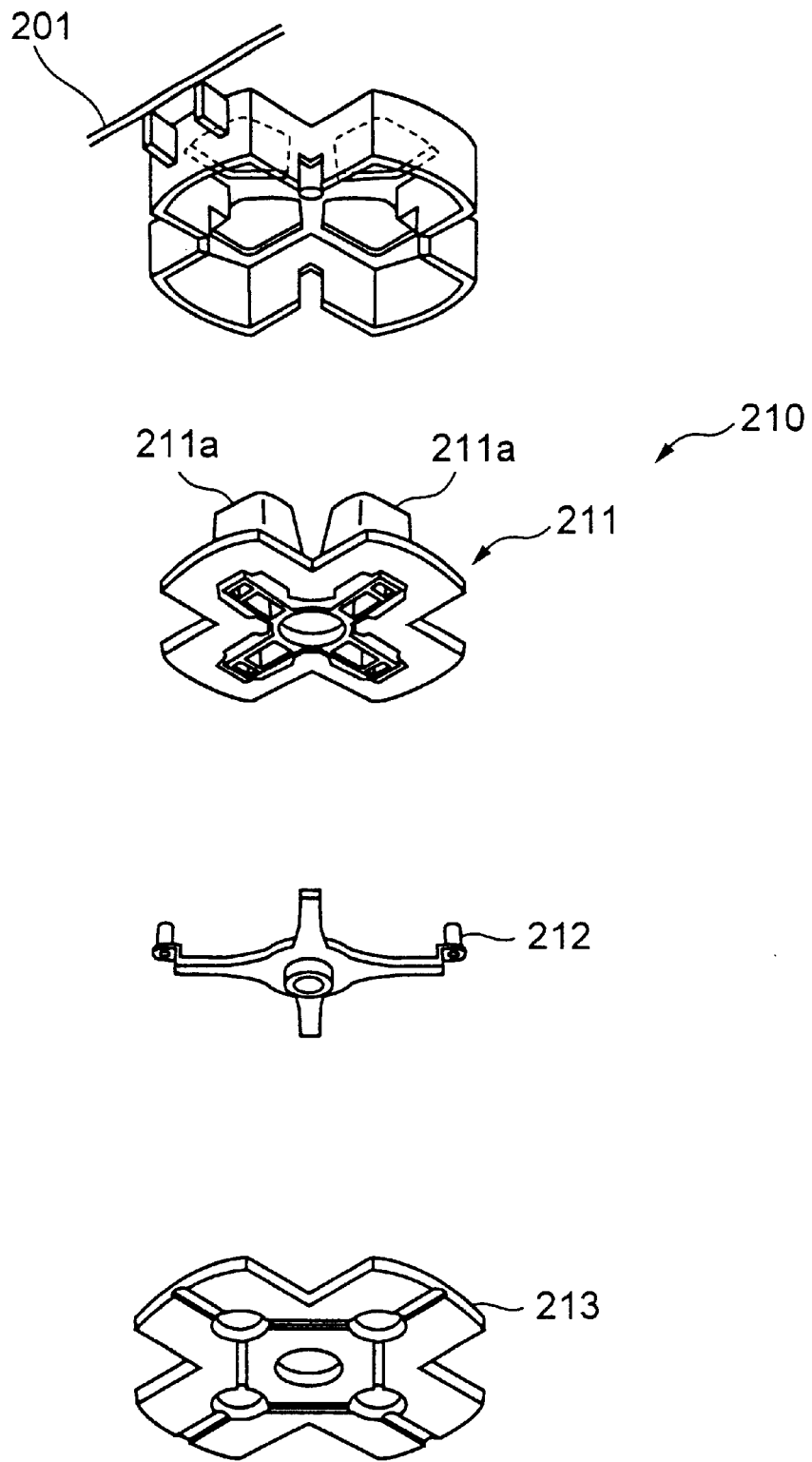
FIG. 18 is an exploded perspective view of the constitution of the first control part of the controller.
Figure 19:
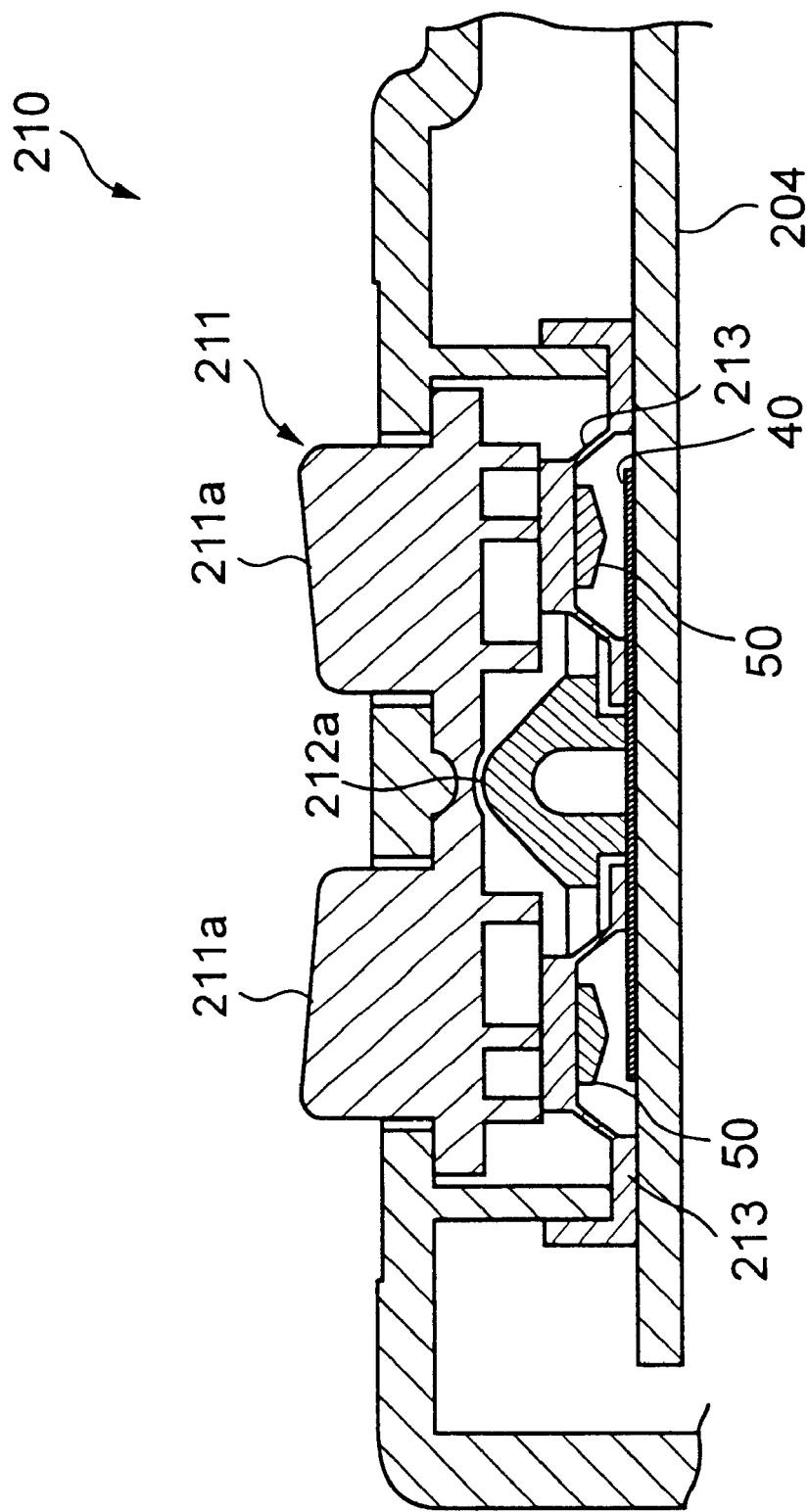
FIG. 19 is a cross section of the first control part of FIG. 18.

FIGS. 18 and 19 show an example of the configuration of the first control part of the controller.

As shown in FIG. 18, the first control part 210 includes a cruciform control unit 211, a spacer 212 that positions this control unit 211, and an elastic body 213 that elastically supports the control unit 211. Moreover, as shown in FIG. 19, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 has already been made public knowledge in the publication of unexamined Japanese patent application No. JP-A-H8-163672. The control unit 211 however, uses a hemispherical projection 212a formed in the center of the spacer 212 as a fulcrum, and the individual control keys 211a (control elements) are assembled such that they can push on the resistor 40 side (see FIG. 19).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so that its electrical resistance value varies depending on the magnitude of the pushing pressure.

Figure 20:
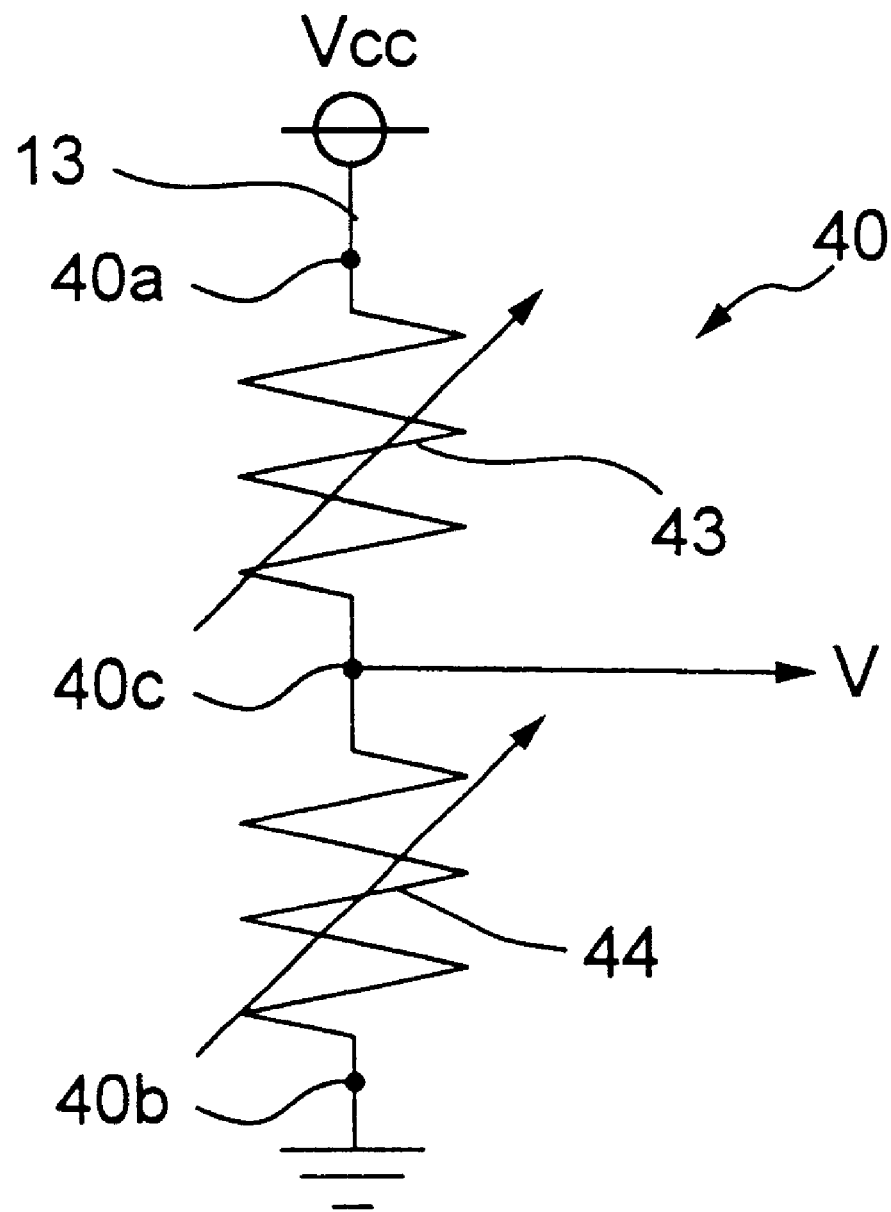
FIG. 20 is a diagram showing a circuit configuration of a resistor.

FIG. 20 is a diagram showing the circuit configuration of the resistor. As shown in this diagram, the resistor 40 is inserted in series in a power supply line 13, where a voltage is applied between the electrodes 40a and 40b. The resistance of this resistor 40 is illustrated schematically, as shown in this diagram, the resistor 40 is divided into first and second variable resistors 43 and 44. Among these, the portion of the first variable resistor 43 is in contact, respectively, with the conducting member 50 that moves together with the control key (up directional key) 211a for moving the character in the up direction, and with the conducting member 50 that moves together with the control key (left directional key) 211a for moving the character in the left direction, so its resistance value varies depending on the surface area in contact with these conducting members 50.

In addition, the portion of the second variable resistor 44 is in contact, respectively, with the conducting member 50 that moves together with the control key (down directional key) 211a for moving the character in the down direction, and with the conducting member 50 that moves together with the control key (right directional key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is provided as output from this output terminal 40c.

The output from the output terminal 40c can be calculated from the ration of the split in resistance value of the first and second variable resistors 43 and 44. For example, if R1 is the resistance value of the first variable resistor 43, R2 is the resistance value of the second variable resistor 44 and $V_{cc}$ is the power supply voltage, then the output voltage V appearing at the output terminal 40c can be expressed by the following equation.

$$V = V_{cc} \times R2/(R1+R2)$$

Therefore, when the resistance value of the first variable resistor 43 decreases, the output voltage increases, but when the resistance value of the second variable resistor 44 decreases, the output voltage also decreases.

Figure 21:
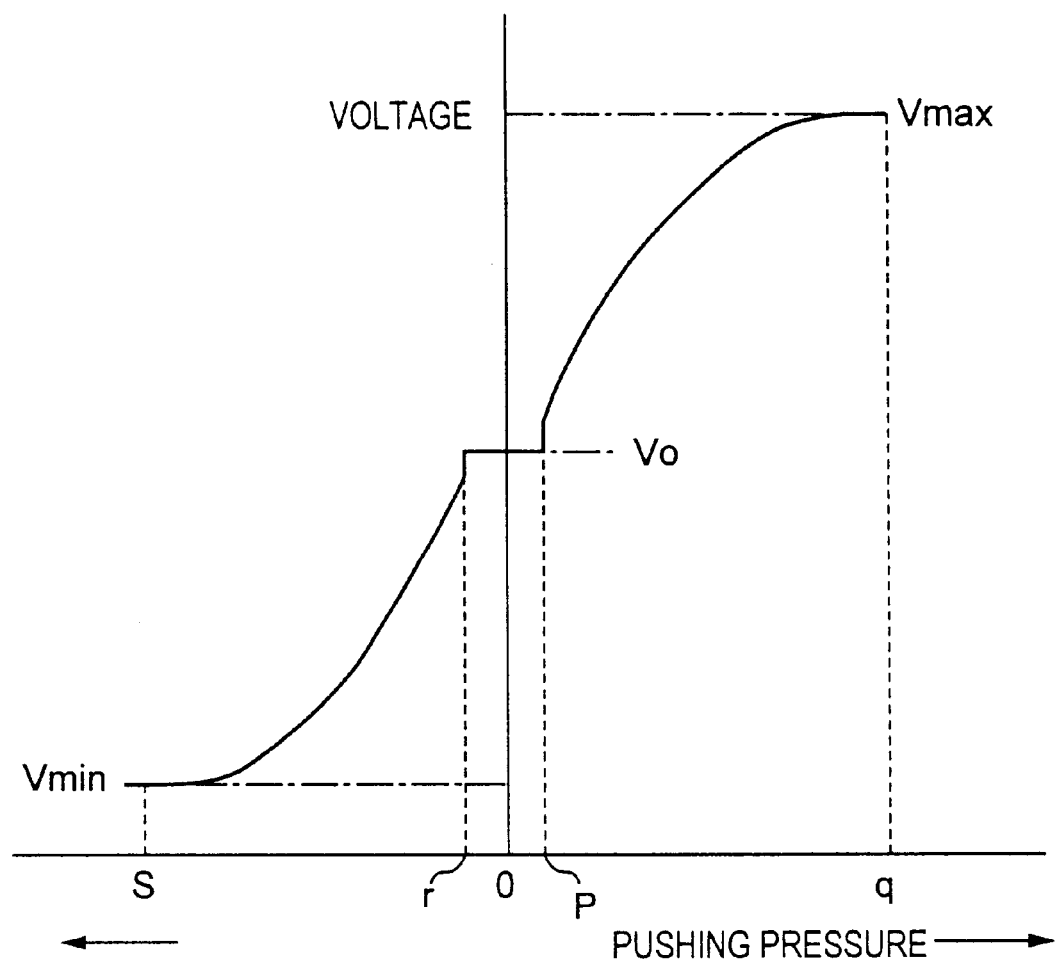
FIG. 21 is a graph showing the characteristic of a signal output.

FIG. 21 is a graph showing the characteristic of the analog signal (voltage) output from the output terminal of the resistor.

First, since a voltage is applied to the resistor 40 when the power is turned on, even if the individual control keys 211a of the control unit 211 are not pressed, a fixed analog signal (voltage) $V_0$ is provided as output from the output terminal 40c (at position 0 in the graph).

Next, even if one of the individual control keys 211a is pressed, the resistance value of this resistor 40 does not change until the conducting member 50 contacts the resistor 40, and the output from the resistor 40 remains unchanged at $V_0$.

Furthermore, if the up-directional key or left-directional key is pushed until the conducting member 50 comes into contact with the first variable resistor 43 portion of the resistor 40 (at position p in the graph), thereafter the surface area of contact between the conducting member 50 and first variable resistor 43 portion increases in response to the pushing pressure on the control key 211a (control elements), and thus the resistance of that portion is reduced so the analog signal (voltage) output from the output terminal 40c of the resistor 40 increases. Furthermore, the analog signal (voltage) output from the output terminal 40c of the resistor 40 reaches the maximum $V_{max}$ when the conducting member 50 is most deformed (at position q in the graph).

On the other hand, if the down-directional key or right-directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control elements), and thus the resistance of that portion is reduced, and as a result, the analog signal (voltage) output from the output terminal 40c of the resistor 40 decreases.

Furthermore, the analog signal (voltage) output from the output terminal 40c of the resistor 40 reaches the minimum $V_{min}$ when the conducting member 50 is most deformed (at position s in the graph).

Figure 22:
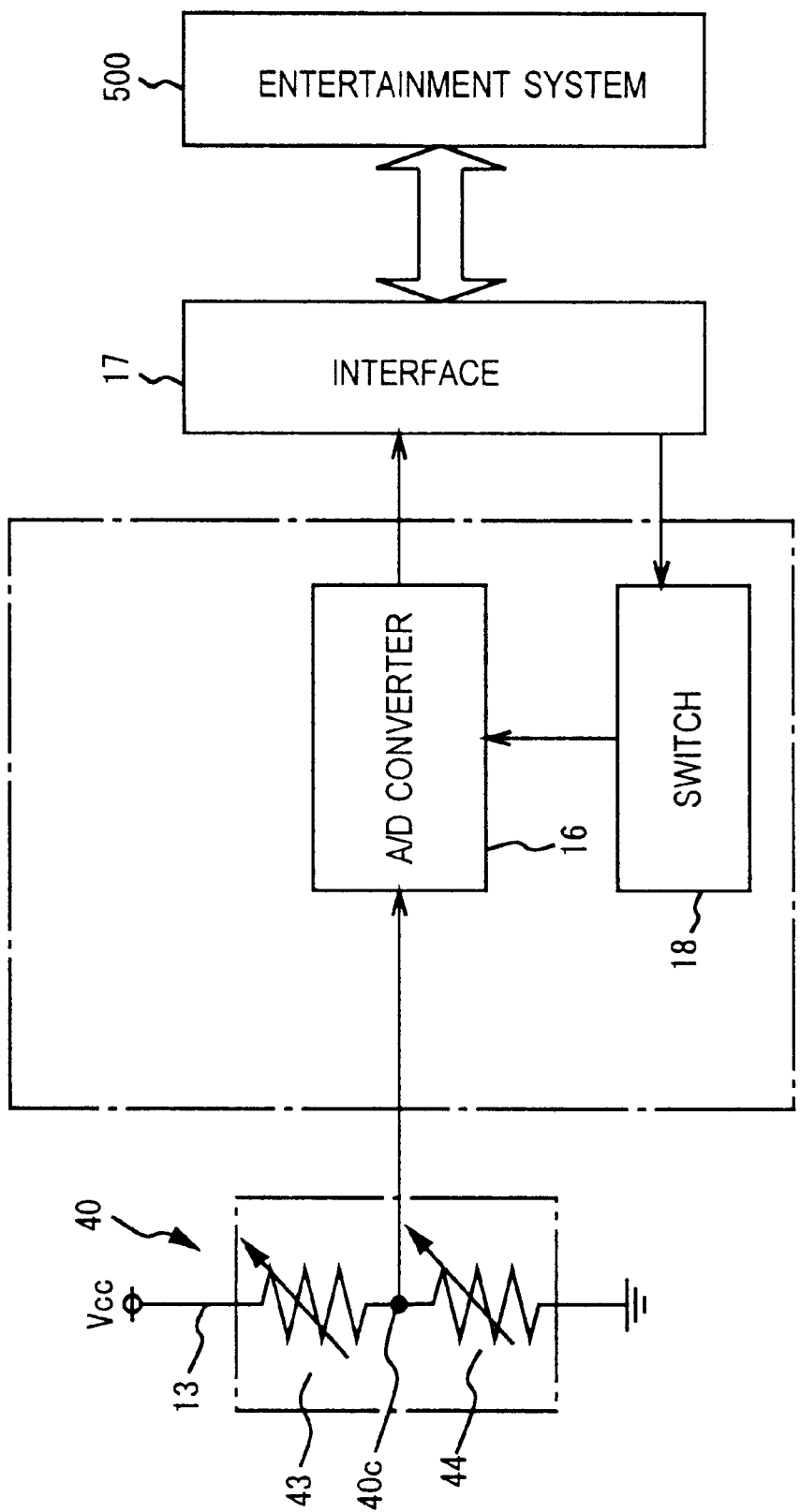
FIG. 22 is a block diagram schematically showing the overall constitution including the resistor.

As shown in FIG. 22, the analog signal (voltage) output from the output terminal 40c of the resistor 40 is provided as input to an A/D converter 16 and converted to a digital signal. It is to be noted that the function of the A/D converter 16 shown in FIG. 22 is as described previously based on FIG. 17, so a detailed description shall be omitted here.

Figure 23:
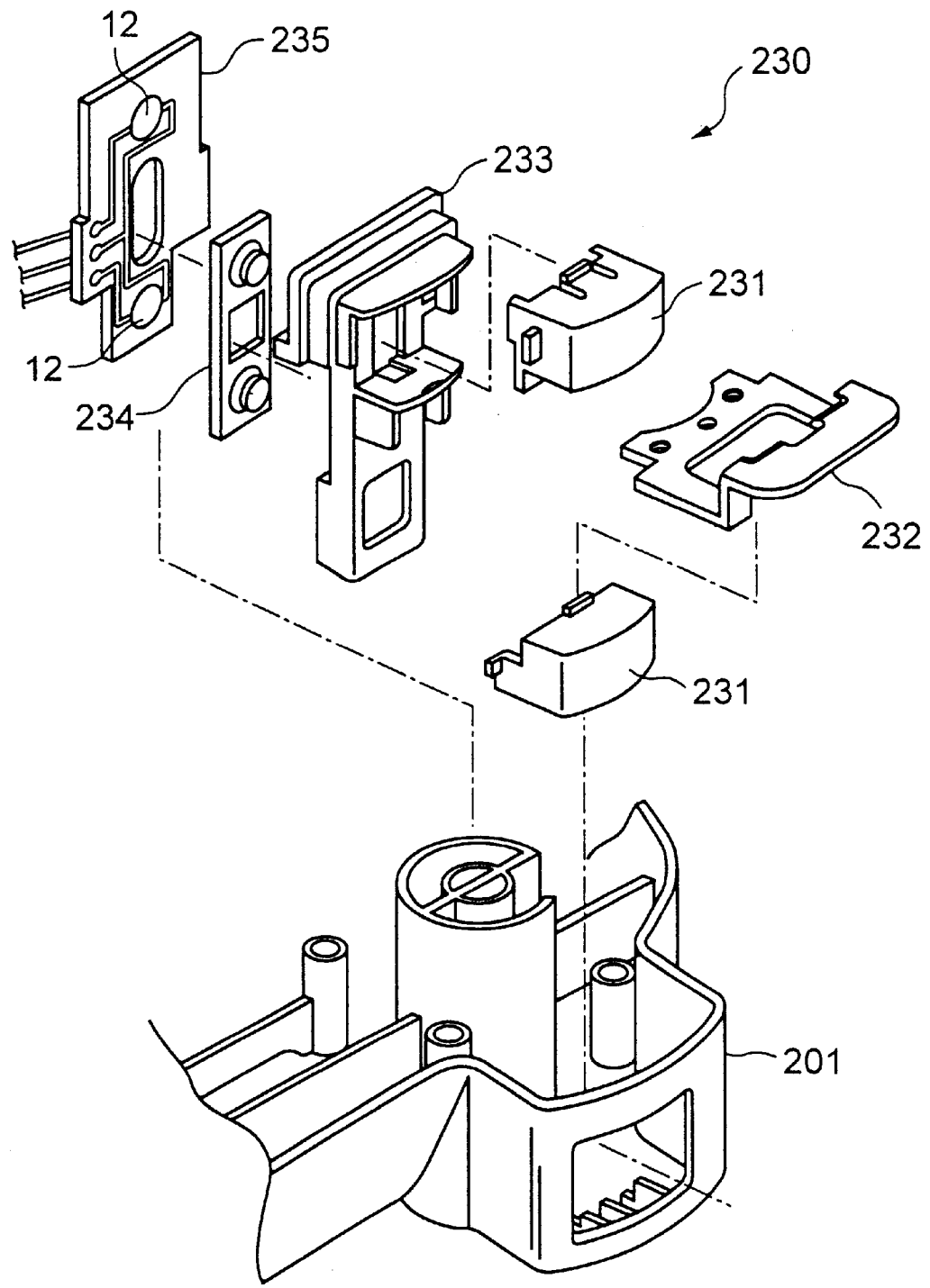
FIG. 23 is an exploded perspective view of the constitution of the third control part of the controller.

FIG. 23 is an exploded perspective view of the third control part of the controller.

The third control part 230 consists of two control buttons 231, a spacer 232 for positioning these control buttons 231 within the interior of the controller 200, a holder 233 that supports these control buttons 231, an elastic body 234 and an internal board 235, having a structure wherein resistors 40 are attached to appropriate locations upon the internal board 235 and conducting members 50 are attached to the rear surface of the elastic body 234.

The overall structure of the third control part 230 also already has been made public knowledge in the publication of unexamined Japanese patent application No. JP-A-H8-163672, so a detailed description thereof will be omitted. The individual control button 231 can be pushed in while being guided by the spacer 232, the pushing pressure when pressed acts via the elastic body 234 on the pressure-sensitive device consisting of a conducting member 50 and resistor 40. The electrical resistance value of the pressure-sensitive device varies depending on the magnitude of the pushing pressure it receives.

It is noted that the fourth control part 240 has the same structure as that of the third control part 230 described above.

While only some embodiments were described above, the present invention may also assume the following alternative embodiment. In the described embodiment, the pressure-sensing value as pushed by the user is used as is. However, in order to correct for differences in the body weights of users or differences in how good their reflexes are, it is possible to correct the maximum value of the user pressure-sensing value to the maximum game pressure-sensing value set by the program, and intermediate values may be corrected proportionally and used. This type of correction is performed by preparing a correction table. In addition, the user pressure-sensing value can be corrected based upon a known function. Moreover, the maximum value of the user pressure-sensing value rate of change may be corrected to the maximum game pressure-sensing value rate of change set in the program, and intermediate values can be proportionally corrected and used for more details about this method, refer to the present inventors' Japanese patent application No. 2000-40257 and the corresponding PCT application JP/(Applicant file reference No. SC00097).

Due to this invention, zoom-in and zoom-out actions are performed in realtime depending on pressure-sensing values, so the user interface can be improved compared to performing zoom-in and out actions with a simple ON/OFF switch.

Moreover, by means of the present invention, modification of objects is performed in realtime depending on pressure-sensing values, so the user interface can be improved compared to performing object modification with a simple ON/OFF switch.

What is claimed is:

1. Electronic equipment comprising:
    a monitor for displaying an image generated by a graphics process;
    a switch including pressure-sensitive means for sensing a variable pushing pressure of a user operating the switch and for generating a current pressure-sensing output that is variable and dependent on said variable pushing pressure;
    a conversion table for converting said current pressure-sensing output into an image magnification; and
    processing means that performs enlargement or reduction processing of said image on said monitor depending on an output from said pressure-sensitive means and in accordance with said image magnification;
    wherein said image is enlarged or reduced by a magnitude that is defined by and depends on a percentage change between said current pressure-sensing output and a previous pressure-sensing output that is variable to form a modified image;
    wherein said processing means performs enlargement processing of images in accordance with a magnitude of said pushing pressure and said current pressure sensing output if there is no previous pressure sensing output, and
    wherein said modified image is displayed on said monitor subsequent to the user operating said switch.

2. The electronic equipment according to claim 1, wherein said processing means performs alternating enlargement and reduction processing with each successive push of said switch.

3. A recording medium on which is recorded a computer-readable and executable software program that performs processing by raking as instructions an output from a controller which has pressure-sensitive means for sensing a variable pushing pressure of a user on the controller, wherein
    said software program comprises a processing program that converts said variable pushing pressure into an image magnification using a conversion table and performs image enlargement or image reduction of objects within a screen of a computer in accordance with the image magnification,
    wherein said objects within said screen are initially generated by a graphics process,
    wherein said objects are enlarged or reduced in accordance with said variable pushing pressure to form modified objects that tare then displayed on said screen subsequent to a user's application of pushing pressure on said controller, and
    wherein said image magnification varies with and depends on a percentage change between a previous pushing pressure and a current pushing pressure.

4. The recording medium according to claim 3, wherein an object is enlarged or reduced on said screen, and wherein said conversion table calculates said image magnification depending on the rate of change per unit time between said previous pushing pressure and said current pushing pressure.

5. A method of zooming comprising the steps of:

generating an image on a screen of a computer using a graphics process;

sensing a previous variable pushing pressure and a current variable pushing pressure applied by a user on a control element of said computer;

convening said previous variable pushing pressure and said current variable pushing pressure into an image magnification using a conversion table;

performing image enlargement or image reduction processing on said image in accordance with said image magnification by magnifying said image by an amount dependent on the percentage change between said previous variable pushing pressure and said current variable pushing pressure to form a modified image; and displaying said modified image on said screen.

6. The method of zooming according to claim 5, further comprising the steps of:

allocating one of image enlargement or image reduction at the time of a first pushing of the user on the control element;

allocating the other of image enlargement or image reduction at the time of a second pushing of the user on the control element; and alternating between the allocation of image enlargement and image reduction with each successive pushing of the user on the control element.

* * * * *